US011463372B2

(12) United States Patent
Calmon et al.

(10) Patent No.: US 11,463,372 B2
(45) Date of Patent: Oct. 4, 2022

(54) METHOD AND APPARATUS FOR CODED MULTIPATH NETWORKING USING PATH MANAGEMENT AND PROTOCOL TRANSLATION

(71) Applicant: Code On Network Coding, LLC, Cambridge, MA (US)

(72) Inventors: Flavio du Pin Calmon, White Plains, NY (US); Muriel Medard, Belmont, MA (US); Kerim Fouli, Cambridge, MA (US)

(73) Assignee: Code On Network Coding, LLC, Cambridge, MA (US)

( * ) Notice: Subject to any disclaimer, the term of this patent is extended or adjusted under 35 U.S.C. 154(b) by 29 days.

(21) Appl. No.: 16/856,480

(22) Filed: Apr. 23, 2020

(65) Prior Publication Data

US 2021/0336896 A1 Oct. 28, 2021

(51) Int. Cl.
*H04L 47/70* (2022.01)
*H04L 41/0896* (2022.01)
*H04L 45/12* (2022.01)
*H04L 45/16* (2022.01)
*H04L 47/10* (2022.01)
*H04L 69/14* (2022.01)

(52) U.S. Cl.
CPC .......... *H04L 47/70* (2013.01); *H04L 41/0896* (2013.01); *H04L 45/124* (2013.01); *H04L 45/16* (2013.01); *H04L 47/29* (2013.01); *H04L 69/14* (2013.01)

(58) Field of Classification Search
None
See application file for complete search history.

(56) References Cited

U.S. PATENT DOCUMENTS 8,068,426 B2 11/2011 Sundararajan et al.
8,130,776 B1 3/2012 Sundararajan et al.
(Continued)

FOREIGN PATENT DOCUMENTS

WO WO 2014/159616 A2 10/2014
WO WO 2018/183694 A1 10/2018

OTHER PUBLICATIONS

U.S. Non-Final Office Action dated Jul. 2, 2021 for U.S. Appl. No. 16/856,340; 19 pages.
(Continued)

*Primary Examiner* — Christine T Duong
(74) *Attorney, Agent, or Firm* — Daly, Crowley, Mofford & Durkee, LLP

(57) ABSTRACT

In some embodiments, a method comprises: transmitting first data units from a source node to a destination node over a first path; receiving information about the availability of one or more second paths between the source and destination nodes; determining a cost associated with each of the one or more second paths; allocating a first number of second data units to the first path and a second number of second data units to the one or more second paths based on the determined costs; and transmitting the second data units from the source node to the destination node over the first path and/or the one or more second paths according to the allocation, wherein the first data units, the second data units, or both the first and second data units comprise network coded data.

25 Claims, 6 Drawing Sheets

(56) References Cited

U.S. PATENT DOCUMENTS

| | | | |
|---|---|---|---|
| 8,279,781 B2 | 10/2012 | Lucani et al. | |
| 8,699,350 B1 | 4/2014 | Kumar et al. | |
| 9,537,759 B2 | 1/2017 | Calmon et al. | |
| 9,877,265 B2 | 1/2018 | Kim et al. | |
| 2009/0201899 A1* | 8/2009 | Liu | H04W 40/02 370/338 |
| 2010/0054164 A1 | 3/2010 | Lucani et al. | |
| 2013/0195106 A1* | 8/2013 | Calmon | H04L 69/14 370/389 |
| 2014/0146924 A1* | 5/2014 | Shattil | H04J 13/0003 375/340 |
| 2017/0012885 A1 | 1/2017 | Ho | |
| 2019/0097754 A1 | 3/2019 | Yu et al. | |

OTHER PUBLICATIONS

Chen, et al., "Multiplexing-Diversity Medium Access for Multi-User MIMO Networks;" IEEE Transactions on Mobile Computing, vol. 15, No. 5; May 2016; 12 pages.

PCT International Search Report and Written Opinion dated Jul. 7, 2021 for International Application No. PCT/US2021/028783; 14 pages.

U.S. Appl. No. 16/856,340, filed Apr. 23, 2020, Calmon, et al.

De Coninck, et al., "Multipath Extension for QUIC;" Downloaded from https://tools.ietf.org/id/draft-deconinck-quic-multipath-00.txt; Mar. 5, 2018; 25 Pages.

Huitema, et al., "QUIC Multipath Requirements;" Downloaded from https://tools.ietf.org/id/draft-huitema-quic-mpath-req-01.txt; Jan. 7, 2018; 12 Pages.

Duke, et al., "Quic Status Pages;" Downloaded from https://tools.ietf.org/wg/quic/; Downloaded from https://tools.ietf.org/wg/quic/; Oct. 4, 2016; 2 Pages.

PCT International Search Report and Written Opinion dated Jul. 8, 2021 for Application No. PCT/US2021/028785; 14 Pages.

Final Office Action for U.S. Appl. No. 16/856,340 dated Feb. 22, 2022; 31 Pages.

Response to Non-Final Office Action filed Nov. 2, 2021 for U.S. Appl. No. 16/856,340; 12 Pages.

* cited by examiner

METHOD AND APPARATUS FOR CODED MULTIPATH NETWORKING USING PATH MANAGEMENT AND PROTOCOL TRANSLATION

BACKGROUND

As is known in the art, there have been several attempts at using multiple paths for transport protocols from a source node to a destination node in a computer network. An example of a multipath protocol is Multi-Path Transmission Control Protocol (MPTCP). MPTCP is one of several multipath protocol implementations proposed by the Internet Engineering Task Force (IETF) working group.

Implementation of multipath protocols such as MPTCP potentially improves the way current computer networks operate by using the resource pooling principle to improve the reliability and throughput of a data communication session. For example, if a communication path between a source and a destination breaks down, or becomes highly congested, data may be sent over alternative paths to thereby avoid any interruption in the data communication session.

Moreover, a multipath protocol potentially enables a client, e.g. a mobile device, to simultaneously establish a connection through multiple network interfaces. Modern communication devices (e.g., smart phones and other handheld communicators, tablet computers with communication functionality, etc.) often possess multiple network interfaces for use with different network technologies having different connectivity characteristics. Such interfaces can provide connections to a cellular network, wired and wireless Local Area Network (LAN), or other devices in an ad-hoc or peer-to-peer mode. The different network technologies may each have, for example, different delay, throughput, and reliability characteristics. For example, a mobile device that is connected to a remote source node through both a cellular network and an IEEE 802.11 wireless LAN may observe different usage costs and quality of service through the respective interfaces.

A goal of multipath protocols such as MPTCP may be to utilize multiple available paths and network resources to carry out communications, to increase throughput, decrease data transit time, and/or make efficient use of available resources. The desire for such benefits has increased with the emergence of more capable (in terms of computational power and communication interfaces) devices. Existing multipath proposals and implementations are limited in one or more respects. For example, one problem in MPTCP is scheduling. The problem of scheduling in MPTCP involves partitioning the data across multiple paths, and dynamically re-adjusting the schedule based upon congestion feedback.

The use of coding in general, specifically Random Linear Network Coding (RLNC), has been proposed to alleviate the scheduling problem of multipath communication. U.S. Pat. No. 9,877,265 ("'265 patent") describes techniques to facilitate multi-path transmission by implementing a transport protocol that emulates current Transfer Control Protocol (TCP)/MPTCP interface (to higher and lower layers) and provides a more effective service using coding. U.S. Pat. No. 9,537,759 ("'759 patent") describes using RLNC in a manner that takes advantage of conventional communication techniques and protocols, providing robustness to link failures particularly in wireless networks as well as the ability to roam from one network to another. For example, the '759 patent describes embodiments that can operate over conventional transport layer protocol (e.g., TCP). Both the '265 and '759 patents are incorporated herein by reference in their entirety.

As is also known in the art, there exist transport-layer protocols that are designed to operate over UDP (User Datagram Protocol). One such protocol is QUIC, which was primarily designed to reduce latency through (1) the removal of head-of-line blocking seen by Transmission Control Protocol (TCP) by establishing a set of multiplexed connections between the endpoints, (2) an improved estimation of congestion, and (3) the inclusion of a form of forward error correction (FEC). The word "QUIC" is sometimes used as an acronym for "Quick UDP Internet Connections," however the IETF uses "QUIC" as a protocol name, not an acronym.

The extension of QUIC to multipath operation has been proposed. See, for example, Q. De Coninck, O. Bonaventure, "Multipath Extension for QUIC," Internet Draft, Oct. 30, 2017 (hereinafter "De Coninck"). A subsequent informational Internet Draft summarizes a set of suggested multipath requirements for QUIC, see C. Huitema, "QUIC Multipath Requirements," Internet Draft, Jan. 7, 2018 (hereinafter "Huitema"). De Coninck proposes a congestion control mechanism that is managed individually at the path level, where a handshake is provisioned for establishing multipath connection. As suggested in Huitema, De Coninck allows path-independent acknowledgements (i.e., feedback) to be transmitted between the endhosts (i.e., the source and the destination nodes). De Coninck proposes additional protocol features, such as path update frames, path state management, and an acknowledgement format, and provides for the collection of path statistics by the endhosts for flow control purposes. Both De Coninck and Huitema are incorporated herein by reference in their entirety.

SUMMARY

According to one aspect of the present disclosure, in a system having a source node and a destination node, a method can include: transmitting first data units from the source node to the destination node over a first path; receiving information about one or more second paths between the source and destination nodes, the received information comprising information on the path availability or path requirements; determining a cost associated with the first path and each of the one or more second paths; determining a first allocation of a first number of second data units to the first path and a second number of the second data units to the one or more second paths based on the determined costs; and transmitting the second data units from the source node to the destination node over the first path and, over the one or more second paths, or over the first path and the one or more second paths according to the first allocation. The first data units, the second data units, or both the first and second data units can include network coded data.

In some embodiments, the first number of second data units and the second number of second data units are both greater than zero. Transmitting the second data units from the source node to the destination node can include transmitting the second data units from the source node to the destination node over the first path and the one or more second paths according to the first allocation.

In some embodiments, receiving information about the availability of the one or more second paths can include receiving the information in a data request sent by the destination node. In some embodiments, the method can include, in response to receiving information about the availability of one or more second paths between the source and destination nodes: generating redundant degrees of freedom (DoFs) by applying network coding to the second data units; and transmitting the redundant DoFs from the source node to the destination node over the first path and the one or more second paths according to the first allocation.

In some embodiments, determining a cost associated with each of the one or more second paths can include determining one or more cost factors associated with each of the one or more second paths. In some embodiments, the one or more cost factors may include at least one of: an absolute cost factor associated with a path; a relative cost factor for two different paths; or a total cost factor associated with two or more paths. In some embodiments, the one or more cost factors can include at least one of: a line delay; a usage cost; a load; a congestion; or a line variability. In some embodiments, determining the one or more cost factors associated with each of the one or more second paths can include: measuring packet delay; or receiving path state information from a network management unit.

In some embodiments, determining a cost associated with the first path and each of the one or more second paths may include: using a cost control function based on at least one of: a fixed budget; a time-varying budget; a fixed budget and bandwidth usage predictions; a time-varying budget and bandwidth usage predictions; or bandwidth usage predictions. In some embodiments, the number of second data units allocated to the one or more second paths may be inversely proportional to the determined costs associated with the one or more second paths.

In some embodiments, the method can include: receiving updated information about one or more second paths between the source and destination nodes; determining an updated cost associated with each of the one or more second paths; determining a second allocation of a first number of third data units to the first path and a second number of the third data units to the one or more second paths based on the determined updated costs; and transmitting the third data units from the source node to the destination node over the first path and the one or more second paths according to the second allocation. In some embodiments, the method can include, in response to determining an updated cost associated with each of the one or more second paths, terminating at least one of the second paths. In some embodiments, the method can include, in response to determining an updated cost associated with each of the one or more second paths, changing one or more of a coding scheme, a coding redundancy, or a number of degrees of freedom (DoFs) used in transmitting the third data units from the source node to the destination node.

In some embodiments, the method can include: transmitting a plurality of data units from the source node to one or more intermediate nodes over a plurality of paths between the source node and the one or more intermediate nodes, wherein the one or more intermediate nodes are configured to transmit encoded data units to the destination node over one or more paths between the one or more intermediate nodes and the destination node.

In some embodiments, the one or more intermediate nodes can include one or more access points (APs), wherein at least a first one of the plurality of paths between the source node and the one or more APs corresponds to a WiFi network, wherein at least a second one of the plurality of paths between the source node and the one or more APs corresponds to a cellular network. In some embodiments, the one or more intermediate nodes may be configured to code data units received from two or more different source nodes together.

According to another aspect of the present disclosure, a method can include: obtaining, at a source node, a plurality of original packets to be transferred to a destination node; generating coded packets by linearly combining two or more of the plurality of original packets using network coding; determining a cost associated with transmitting data over each of a plurality of paths; and distributing the one or more of the coded packets among the plurality of paths leading from the source node to the destination node, wherein a total number of packets allocated to each of the one or more multiple available paths is selected according to the determined cost associated with each path; and transmitting the one or more coded packets to the destination node according to the distribution.

According to another aspect of the present disclosure, in a system in having one or more source nodes, at least one intermediate node, and a destination node, wherein the intermediate node and a destination node are capable of establishing a transport session and transmitting encoded data between them via one or more available, different output paths between the intermediate node and the destination node, a method may include: transmitting data destined to the destination node from the one or more source nodes to the intermediate node via one or more connections; encoding the data at the intermediate node; and transmitting the encoded data via one or more connections from the intermediate node to the destination.

According to another aspect of the present disclosure, a device may be provided for use at a source node for transferring data to a destination node. The device can include: a processor; and a non-volatile memory storing computer program code. The storing computer program code, when executed on the processor, can causes the processor to execute a process operable to: transmit first data units from the source node to the destination node over a first path; receive information about one or more second paths between the source and destination nodes, the received information comprising information on the path availability or path requirements; determine a cost associated with the first path and each of the one or more second paths; determine an allocation of second data units to the first path and to the one or more second paths based on the determined costs; and transmit the second data units from the source node to the destination node over the first path, over the one or more second paths, or over the first path and the one or more second paths according to the determined allocation.

In some embodiments, receiving information about the availability of the one or more second paths may include receiving the information in a data request sent by the destination node. In some embodiments, the device can include, in response to receiving information about the availability of one or more second paths between the source and destination nodes: generating redundant degrees of freedom (DoFs) by applying network coding to the second data units; and transmitting the redundant DoFs from the source node to the destination node over the first path and the one or more second paths according to the determined allocation.

In some embodiments, determining a cost associated with each of the one or more second paths can include determining one or more cost factors associated with each of the one or more second paths. In some embodiments, the one or more cost factors can include at least one of: an absolute cost factor associated with a path; a relative cost factor for two different paths; or a total cost factor associated with two or more paths. In some embodiments, the one or more cost factors include at least one of: a line delay; a usage cost; a load; a congestion; or a line variability.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Described herein are structures and techniques for use in multipath communication networks, including networks that use coding to enable multipath operation at the transport layer. Various embodiments provide path management and path splitting in multipath communication applications. In some embodiments, an intermediate network device (IND) may function as a virtual end-point for partially terminating connections and for translating between different transport protocols, including translating to and from coded multipath protocols. The structures and techniques sought to be protected herein can be applied to heterogeneous networks, including but not limited to mobile network applications.

Figure 1:
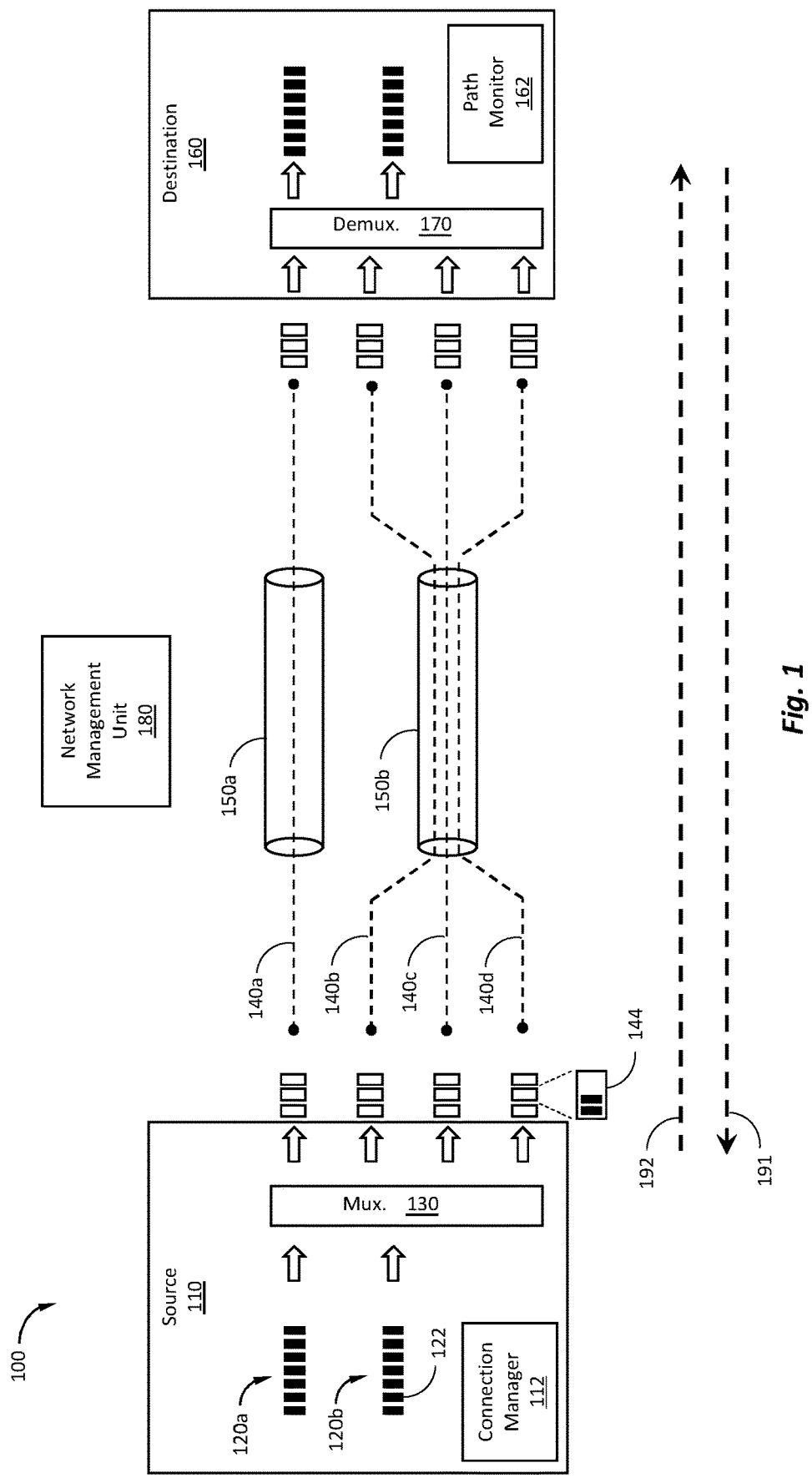
FIG. 1 is a network diagram illustrating multipath communication in a computer network, according to embodiments of the present disclosure.

FIG. 1 illustrates multipath communication in a computer network 100, according to some embodiments of the present disclosure. A source (or "sender") 110 can be communicatively coupled to a destination (or "receiver") 160 via a plurality of paths 150a, 150b, etc. (150 generally). A path 150 may correspond to a logical association between the source 110 and the destination 160. Multiple paths 150 may exist between the source and the destination. For example, paths from a video server to a smartphone can be established via different radio interfaces such as WiFi (IEEE 802.11) and LTE (Long-Term Evolution). The example of FIG. 1 includes two paths 150a, 150b.

The source 110 and destination 160 may correspond to the endhosts (or "hosts") of a transport operation, performing multiplexing and encapsulation operations required at the transport layer. As shown in FIG. 1, multiplexing may be performed by way of a multiplexer 130 at the source 110 and a demultiplexer 170 at the destination 160. The source 110 and destination 160 may also perform flow control and reliability operations.

Multiple data streams 120a, 120b, etc. (120 generally) can be established between the source 110 and the destination 160. A data stream (or "stream") 120 can be used to transmit application data from the source 110 to the destination 160. In the example of FIG. 1, source 110 is shown sending two data streams 120a, 120b to the destination 160. Each stream 120 may be segmented or mapped into one or more frames (e.g., frame 122). Frames from different streams 120 can be multiplexed together and formed into packets (e.g. packet 144) and transmitted across one or more of the paths 150. Frames and packets can also carry control information.

One or more connections 140a, 140b, 140c, 140d, etc. (140 generally) can be established between the source 110 and the destination 160, with each connection associated with a given path 150. A connection 140 can carry packets between the source 110 and the destination 160 and may be characterized by different properties such as error rate, delay, encryption requirements, reliability, etc. In the example of FIG. 1, a first path 150a has one connection 140a whereas a second path 150b has three connections 140b, 140c, 140d.

Data flow in transport protocols typically starts with a request from the destination 160, usually in the form of a number of octets (or bytes). Such requests typically follow a credit-based flow control protocol, examples of which include QUIC and Hypertext Transfer Protocol 2.0 (HTTPS/2). In such protocols, credits represent permissions to transmit a given number of octets.

Transport protocols such as TCP and QUIC typically rely on a sliding-window at both the source 110 and destination 160 to track sent and received frames (or packets). At the source 110, feedback from the destination 160 in the form of packet acknowledgements (ACKs), coupled with transmission credits, enable the source 110 to remove frames from its window, thus allowing it to insert new frames from the stream, slide the window, and carry on with the transmission. The destination 160 inserts received frames into its window and typically removes them when they are transmitted, in order, to a stream-requesting application.

Coded transport protocols such as the ones described in the '265 and '759 patents carry out the coding of data units (e.g., frames, packets, or octets) to enable multipath operation and improve reliability. Such coded protocols are able to introduce redundant erasure-correcting data units (redundancy) at any node in the network (e.g., at a data "chokepoint") and, as such, can be used to achieve a desired coding rate for a stream or connection.

Coded transport protocols use the notion of coded degrees of freedom (DoFs), where DoFs are transport data units that are useful for decoding operation. The term "degree of freedom" (DoF) is used herein to denote both coded and uncoded (i.e., native) data units. In RLNC, a coded data unit is a linear combination of uncoded data units. A DoF window, or coding window, can be utilized by a source 110 to control the amount of data it codes together at any given time, and at a destination 160 to collect received packets and carry out decoding operations, such as described in the '265 and '759 patents. The source 110 and the destination 160 can establish connections 140 over one or more network paths 150, where the source 110 distributes frames among available connections 140. The frames allocated to each path 150 may be uncoded or coded. In either case, they can be regarded as degrees of freedom (DoFs).

According to some embodiments of the present disclosure, the establishment and management of paths 150 and connections 140 between the source 110 and destination 160 can be controlled by the source 110, by the destination 160, by both the source 110 and destination 160 in a cooperative fashion, and/or by a network management unit 180 separate from the source 110 and the destination 160. The network management unit (or "network controller") 180 may be a standalone node of the network 100, or may be part of another node in the network, such as a router, switch, access point (AP), base station, gateway, middlebox, or proxy node. While embodiments of the present disclosure may be described as having a source 110 establish and manage paths and connections, it should be understood that similar functionality can be implemented within the destination 160 and/or the network management unit 180. In some embodiments, network management unit 180 can instruct any two nodes along a given network path to split and terminate a new path/connection.

Still referring to FIG. 1, source 110 can include a connection manager 112 configured to manage paths and connections in an opportunistic manner, including path/connection setup, path/connection termination, and the modification of transmission characteristics across one or more paths/connections, based on a static or dynamic cost function. A cost function can include any mathematical function that maps a value representing cost to one or more communication parameters such as bandwidth, utilization, or delay. Destination 160 can include a path monitor 162 to collect information about the characteristics of the various network paths 150a, 150b, etc. (e.g., availability, delay) as well as the requirements of the data streams (e.g., requested rate, delay, jitter). Path monitor 162 can further be configured to measure a cost or one or more cost factors associated with each of the paths 150. Cost factors can include transport metrics that are useful in determining path costs.

Path cost can be determined by the source 110 or destination 160 using various cost factors such as path delay (i.e., the average or individual packet delay through a given path), path usage (i.e., the added or relative usage of a given path per transported data unit, as illustrated in the example above), path load (i.e., available load in frames per unit time or bits/second of each available path), congestion (i.e., a congestion metric across a given path such as congestion-related packet delay or delivery likelihood across any given path), or path variability (the variability of any transport metric such as jitter or variance in packet reception time).

Path cost can be represented as an absolute metric according to one or more cost factors, as a relative value (or "advantage"), or a function of one or more absolute metrics and relative values.

Path cost can be static over the duration of a session or can vary dynamically during a session. In some embodiments, path cost can vary in response a change in one or more metrics measured by the source 110 or destination 160, such as frame delay (i.e., any statistic related to the time it takes a frame to partially or completely reach the destination node). In some embodiments, path cost may vary in response to information collected or generated by network management unit 180, such as information on the state of paths/connections, or statistics related to packet latency, congestion, delay, and/or packet loss. In some embodiments, the network management unit may determine the cost and allocate paths by communicating with the source 110 and/or the destination 160.

In one embodiment, the number of DoFs allocated to each path 150 may be selected so that they are related (e.g., according to a given mathematical relationship such as an inverse proportionality) to a cost incurred across each path 150. A connection 140 across a path 150 can be established in response to a request for data sent from destination 160 to source 110, as illustrated by dashed line 191 in FIG. 1 (dashed line 192 indicates the flow of data units from source 110 to destination 160). A connection 140 may be associated with a session (e.g., an application session) established between the source 110 and the destination 160. The data request 191 may include information about the availability, requirements, and cost factors for one or more paths 150 within the network 100. Such path information can be generated by path monitor 162 within the destination 160. The transmitting of cost and other path information from destination 160 to source 110 may be referred to as a "cost announcement." In other embodiments, source 110 may directly measure/collect the path information. For example, connection manager 112 may be configured to perform some or all of the processing described herein for path monitor 162. In still other embodiments, the path information may be generated by standalone network management unit 180 and transmitted to source 110 and/or destination 160 over paths 150 or over a separate network control channel.

After a number of connections 140 are established across one or more paths 150, source 110 and destination 160 may exchange information regarding path cost through cost announcements that may be carried by control frames. Source 110 (or, more particularly, connection manager 112 at the source 110) may then proceed to adjust the path transmission characteristics (including possible path termination), based on the cost function. To make those adjustments, source 110 may use a given objective (e.g., target maximum cost for an operating path per unit time, target maximum cost per session per unit time, etc.). Such an objective may be communicated to the source 110 by the destination 160 or by the network management unit 180 before or during the session.

By way of example, destination 160 may correspond a user device (e.g., a laptop, smartphone, or tablet) or an access point (AP) connected to both a WiFi network and an LTE network or other type of cellular network. That is, path 150a may correspond to a WiFi network and path 150b may correspond to an LTE network. A fixed or variable cost may be associated with each path 150a, 150b. The costs may be determined using one or more cost factors as previously discussed. Assuming the cost associated with LTE network 150b is twice the cost associated with WiFi network 150a during a first time interval T1, the number of data units (e.g., frames, packets, or DoFs) assigned to (or "directed to") the LTE network 150b may be set to half the number of data units assigned to the WiFi network 150a during the first interval T1. In some embodiments, a fixed or time-varying budget may be used to determine the number of data units assigned to paths 150 and/or connections 140.

As used herein, the term "budget" denotes an allowed total cost per unit time (e.g., interval) or per network element (e.g., stream, connection, path, or allocated for the communication between the source 110 and the destination 160). In the example above, assume that (1) the WiFi 150a and LTE 150b networks offer 100 Mbps and 50 Mbps, respectively, (2) the requested total bandwidth is 75 Mbps, (3) the cost is 1 and 2 cost units per Mb for the WiFi 150a and LTE 150b networks, and (4) the allocated budget is 2 cost units per second for the duration of the communication. Given the budget, the maximum bandwidth on LTE 150b is 50 Mbps, whereas WiFi 150a can support the required 75 Mbps at a cost of 0.75 cost units per second, a cost that is within the budget. In the above example, it is possible to include factors other than bandwidth (e.g., packet delay, jitter, path variability) into the cost function and budget allocation, leading to possible optimization of a communication parameter (e.g., rate) across the two paths.

In certain embodiments, bandwidth usage predictions can be used to determine the number of data units assigned to paths 150 and/or connections 140. Such predictions can be based on historical path characteristics as well as more recent connection and/or stream statistics. Artificial intelligence and machine learning mechanisms can be used to improve usage predictions.

Upon receiving a cost announcement, source 110 may take one or several courses of action. First, source 110 may terminate an existing path/connection or establish a new path/connection based on a path cost computed at the source or destination. Second, source 110 may modify the coding scheme across one or more paths/connections based on computed path costs. For example, source 110 may adjust the amount of coding redundancy or a code rate based on computed path costs. This can include generating new coded frames (i.e., redundancy or DoFs) specifically for an additional path/connection, halting coding operations, or halting the transmission of coded frames across a given path/connection based on a computed path cost.

Figure 2:
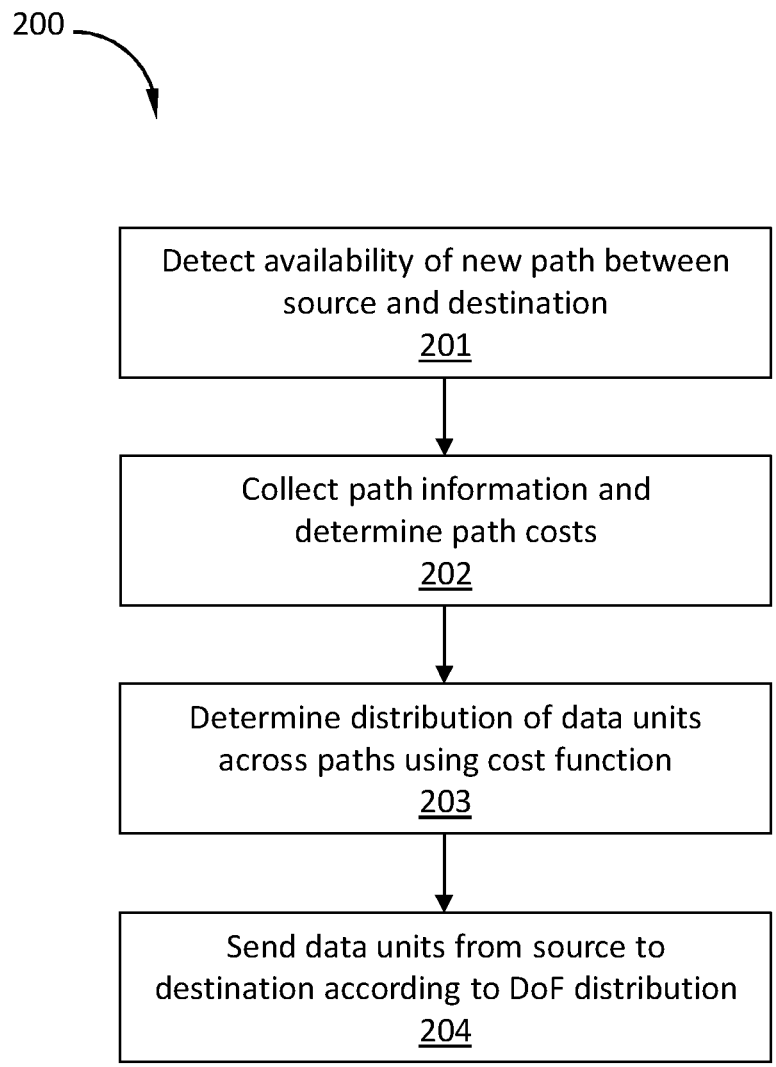
FIG. 2 is a flow diagram of a process for opportunistic multipath communication, according to embodiments of the present disclosure.

FIG. 2 shows a process 200 for opportunistic multipath communication, according to embodiments of the present disclosure. In this disclosure, the term "opportunistic multipath communication" refers to communication between nodes of a computer network using multiple available paths between the nodes, where new paths may be utilized as they become available. Likewise, an "opportunistic multipath session" refers to a multipath session that is initiated in response to a new path becoming available (e.g., a single-path session between a source and a destination may be converted to a multipath session in response to a new path becoming available between the source and the destination).

Portions of process 200 can be implemented within and performed by a source (e.g., source 110 of FIG. 1), a destination (e.g., destination 160 of FIG. 1), and/or a network management unit (e.g., network management unit 180 of FIG. 1).

At block 201, the source may detect that a new path to the destination is available. This may be performed prior to initiating a session or during the pendency of a session. In some embodiments, block 201 may include determining that a new network interface has become available. It is appreciated herein that a path may become available in response to varying network conditions (e.g., a path becomes available after recovering from congestion or failure) or by the dynamic nature of the network (e.g., the source moves within range of a new access point).

At block 202, in response to detecting that the new path is available, path information may be collected and used to evaluate a path cost for the new path and existing paths. It should be understood that initially there may be no existing paths and, thus, the new path may correspond to the first available path. As discussed in more detail above with FIG. 1, collected path information can include information regarding path delay, path usage, path load, path congestion, and/or path variability information.

At block 203, the path costs determined at step 202 can be used to determine a distribution of data units (e.g., frames, packets, or DoFs) across the updated set of available network paths (e.g., one more available network paths). For a given path, the distribution of data units may be defined by the rate of data units transmitted by the source over that path. The number of data units allocated to a given path may be zero or greater than zero. In some embodiments, block 203 can include a determination by the source of whether to terminate one or more connections or paths within the network. The termination of a path refers to the termination of the logical association between the source 110 and the destination 160 and can include the termination of all connections using or otherwise associated with that path. For example, a given path can be terminated due to persistent high cost or upon receiving directions from a network management unit.

At block 204, the source may transmit data units to the destination over one or more paths according to the distribution determined in 203. Process 200 can be repeated, in whole or in part, as new paths and/or new path information becomes available to the source, to the destination, and/or to the network management unit. For example, the distribution of data units determined at block 203 may be applied by the source until new path information becomes available to the source, at which time process 200 may repeat from block 202. As another example, if a new path becomes available between the source and the destination, process 200 may repeat from block 201.

In the WiFi/LTE example discussed above, a device running a 3 Mbps connection through WiFi at a cost of $5/Mbps may initiate a new path through an LTE interface costing $10/Mbps. Assuming, for illustrative purposes, an objective to send as much data via LTE below a total budget of $20/Mbps, process 200 may compute that the bandwidth usage for WiFi and LTE should be 2 Mbps and 1 Mbps, respectively. Assuming further that equal-sized data units are used, process 200 may determine that one data unit should be sent through LTE for every two data units sent through WiFi (e.g., using a simple round-robin process). The present disclosure is not limited to any particular path management process. The device may update its path information upon receiving new information about the LTE path (e.g., network management, channel state information, packet loss, etc.). Such an update may lead to a new determination of DoF distribution across paths, as shown above. Regarding the structures and techniques sought to be protected herein, a variety of cost functions and methods for distributing data units across network paths may be implemented and used.

Figure 3:
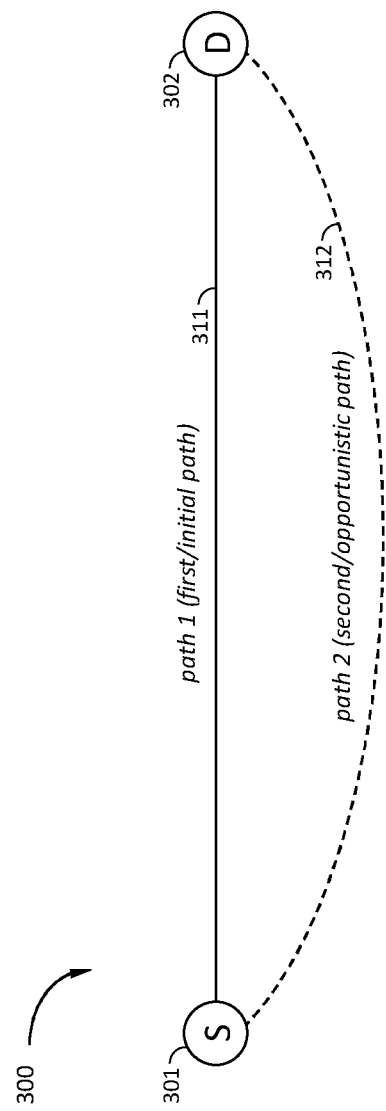
FIG. 3 is a network diagram illustrating how opportunistic multipath can be employed by one or more nodes of a computer network, according to embodiments of the present disclosure.

FIG. 3 illustrates how opportunistic multipath (e.g., according to process 200 of FIG. 2) can be employed within one or more nodes of a computer network. A multipath session can be initiated at session initialization or during an ongoing session between a source and a destination. In this disclosure, a multipath session starting at the moment a path becomes available is called an opportunistic multipath session. At any time during the session, including at session initialization, an opportunistic multipath session can be set up between the source and the destination.

Referring to the embodiment of FIG. 3, a simplified network 300 can include a source 301 and a destination 302. Source 301 and destination 302 have an ongoing session using a first (or "primary") path 311. During the session, source 301 determines that a second path 312 to destination 302 has become available. Source 301 can collection information and determine costs for paths 311 and 312, e.g., using a cost function and processing described above for block 202 of FIG. 2. Source can determine a distribution of data units (e.g., frames, packets, or DoFs) across the two paths 311, 312, e.g., using the processing described above for block 203 of FIG. 2. Source may transmit data units across paths 311, 312 according to the determined distribution, and may terminate one or more paths 311, 312 response to changing network conditions or path state.

The process of setting up a multipath session may depend on the underlying network technology (e.g., bandwidth allocation mechanisms, medium access control (MAC), centralized vs. distributed control, etc.). It may be carried out (a) by network management unit that instructs any two nodes along a path to split and terminate a new path/connection; (b) at the source 301; and/or (c) at the destination 302. An illustrative process for path splitting is described below in the context of FIG. 4.

For example, in a wireless, wired, or hybrid network, a new path may become available to carry a connection (e.g., a WiFi network becomes available at a device using LTE to download or upload content). In a wireless network, using a second access point (AP) or base station (cellular) may become possible or advantageous temporarily or permanently during a session. A multipath session may be initiated at the device, the AP/base station, or a gateway node. Furthermore, opportunistic multipath sessions may improve performance during a soft handoff, when more than one network is available to a device.

The methods described herein can be used within a session opportunistically. Opportunistic multipath sessions may be initiated by an application endpoint by opening a new socket or port for communication with the other endpoint (e.g., web client to server). Similarly, a router or switch may make new ports available, allowing neighboring nodes to detect and initiate new paths on the fly. Moreover, a wired or wireless mesh network node may discover new routes between two nodes, thus allowing mesh nodes to discover new paths. The use of network coding facilitates multipath coding since the use of DoFs instead of packets simplifies data transfer protocols (e.g., simplification of in-order arrival requirements) and reduces the state information (e.g., metadata) required for reliable communication.

In more detail, network coding facilitates the use of opportunistic multipath because any available bandwidth on any path can be readily used to transport DoFs without the need for coordination between nodes, thereby reducing complexity and resource usage in the network. Using network coding, any set of available paths can be used to transmit DoFs, allowing for opportunistic path selection to achieve a desired objective, such as high throughput or low decoding delay. Without network coding, scheduling would need to take place and a schedule would generally not be able to take opportunistically advantage of multipath resources (e.g., because doing so may disrupt the schedule), or would only be able to use replication, which severely curtails the usefulness of opportunistic multipath resources. According to disclosed embodiments, the coding scheme need not be aware of the fact that opportunistic multipath is being used. This is because, with network coding, throughput is primarily determined by DoFs, not necessarily of the means by which they are conveyed. In the case where the objective is low delay, the coding scheme may be adapted to opportunistic multipath in order to reduce delay characteristics.

Figure 4:
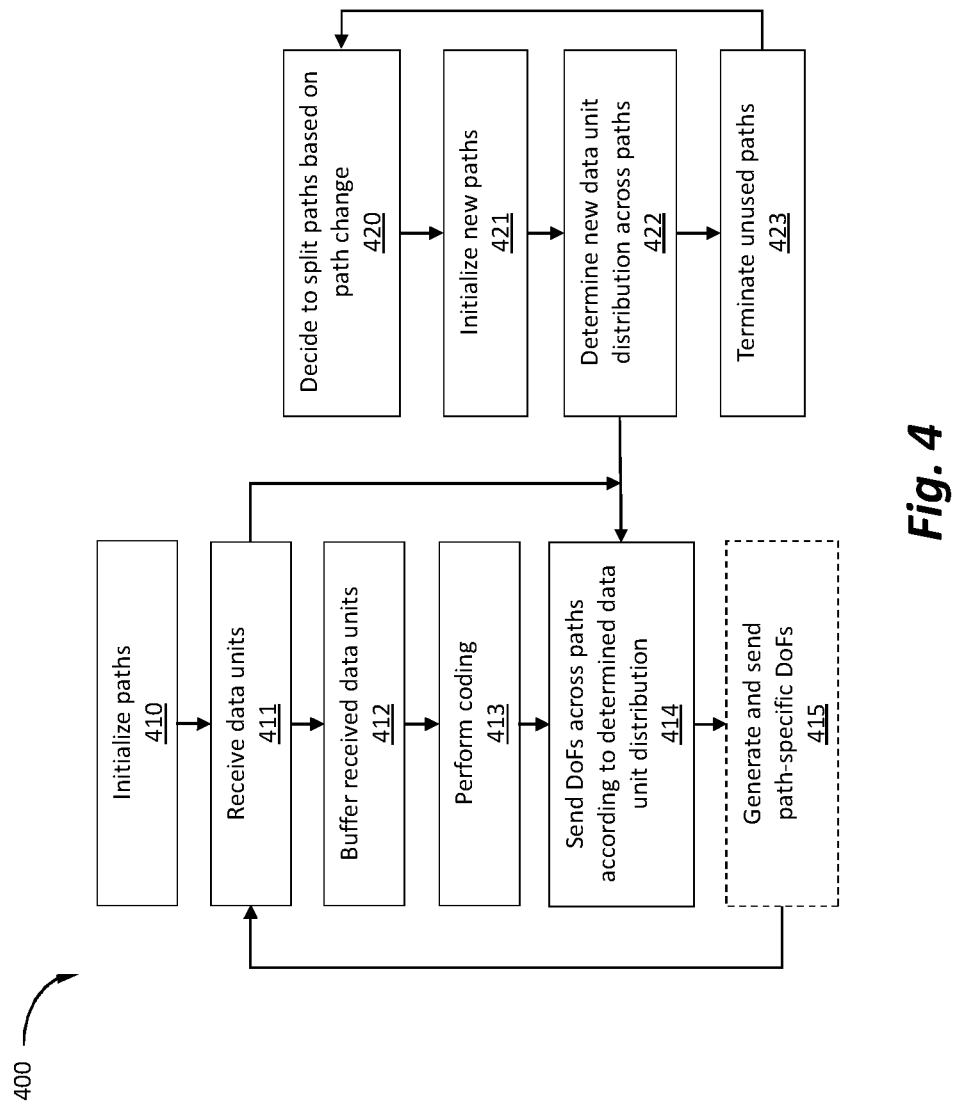
FIG. 4 is a flow diagram of a process for path splitting, according to embodiments of the present disclosure.

Referring to FIG. 4, path splitting is the act of initiating a new multipath session during a session between a source and a destination. Path splitting may occur in response to a set of triggers that include but are not limited to the following: (a) discovery of a new path or route (e.g., a new Internet Protocol, IP, route); (b) discovery of new nodes in the network (e.g., new nodes in a mobile wireless mesh network); and/or (c) a relative or absolute change in the performance of an existing path (e.g., the primary path), including a degradation of one path relative to another for a given performance metric or cost factor (e.g., congestion, frame loss rate, etc.). The performance of paths can be quantified using a cost function as discussed above.

Path splitting may be directional (i.e., specific to a downlink or uplink) or bidirectional (i.e., non-specific), depending on the network technology used. For example, in a cellular network, path splitting may be applied to an uplink from a device to a base station but not to a downlink. In other words, the download can remain unchanged while the uplink may be split to use multiple paths (e.g., through collaborating devices of other base stations) from the device to the base station. In some embodiments, path splitting is not limited to a single opportunistic path. Instead, multiple additional paths can be opportunistically initiated or terminated over the course of a session.

FIG. 4 shows a process 400 for path splitting, according to an embodiment of the present disclosure. The illustrative process 400 can be implemented and performed by one or more nodes of a computer network, such as by source 110 of FIG. 1.

At block 410, the source can initialize one or more paths and one or more connections in preparation for a session with a destination. At block 411, the source receives new data units (e.g., frames). The data units may be received from by a higher layer of the source's network stack, such as from an application layer within the source node. The received data units 411 may then be buffered 412 and coded 413 to generate additional DoFs. The received data units 411 may be sent to both processing blocks 412 and 414 in a parallel or simultaneous manner.

At block 414, the source may determine a distribution of data units to be sent across the one or more paths associated with the session. The distribution may be determined using a cost function, as described in detail above in the context of FIG. 2. The received data units 411 may be coded 413 to generate DoFs required by each path according to an initial evaluation of the DoF distribution. That is, once a DoF distribution and rate 414 is determined for each connection, additional DoFs may be generated through coding 413 and transmitted across one or more paths/connections according to their distributions 414.

The received data units may also be buffered (block 412) and coded (block 413) to generate redundant DoFs to satisfy the DoF distribution. In particular, at block 412, the data units may be added to a fixed or variable-size coding buffer maintained by the source. At block 413, data units within the coding buffer may be combined/coded together using RLNC or other type of network coding.

In some embodiments, as illustrated by optional block 415, the source may perform coding at the level of individual paths. In particular, the source may generate and send redundant DoFs for specific paths according to the determined DoF distribution (from block 414). Following block 414 and/or block 415, processing can repeat from block 411, as shown in FIG. 4.

The illustrative process 400 also includes blocks 420-423, which can be performed in parallel with previously described blocks 410-415.

At block 420, a decision can be made to perform path splitting between the source and the destination. As discussed previously, path splitting may occur in response to one or more triggers, such as discovery of a new path/route/node in the network or a detected change in the relative or absolute performance/cost of an existing path. The source can receive information about path performance and the availability of new paths in a periodic or continuous manner.

At block 421, after a decision has been made to perform path splitting, the source can initialize one or more new paths. At block 422, the source may determine a new distribution of data units (e.g., DoFs) across the paths associated with the session, including the recently initialized paths. The new distribution may be based on a cost function and associated cost factors for each path. The new distribution can be subsequently used during the multipath transmission of DoFs to the destination (at block 414). At block 423, paths that are deemed unused by the source can be terminated. Following block 423, processing can repeat from block 420, as shown in FIG. 4.

According to processing illustrated in FIG. 4, the source node can adjust the redundancy over each path. Buffering can be carried out specifically for the purposes of coding or recoding (as shown in blocks 413 and 415). For example, the N most recent data units (e.g., frames) can be buffered (block 412) for purposes of coding and balancing DoFs among paths (block 414). Path-specific recoding can be performed for the purposes of compensating for path losses or further balancing among paths (block 415).

Figures 5A, 5B, 5C:
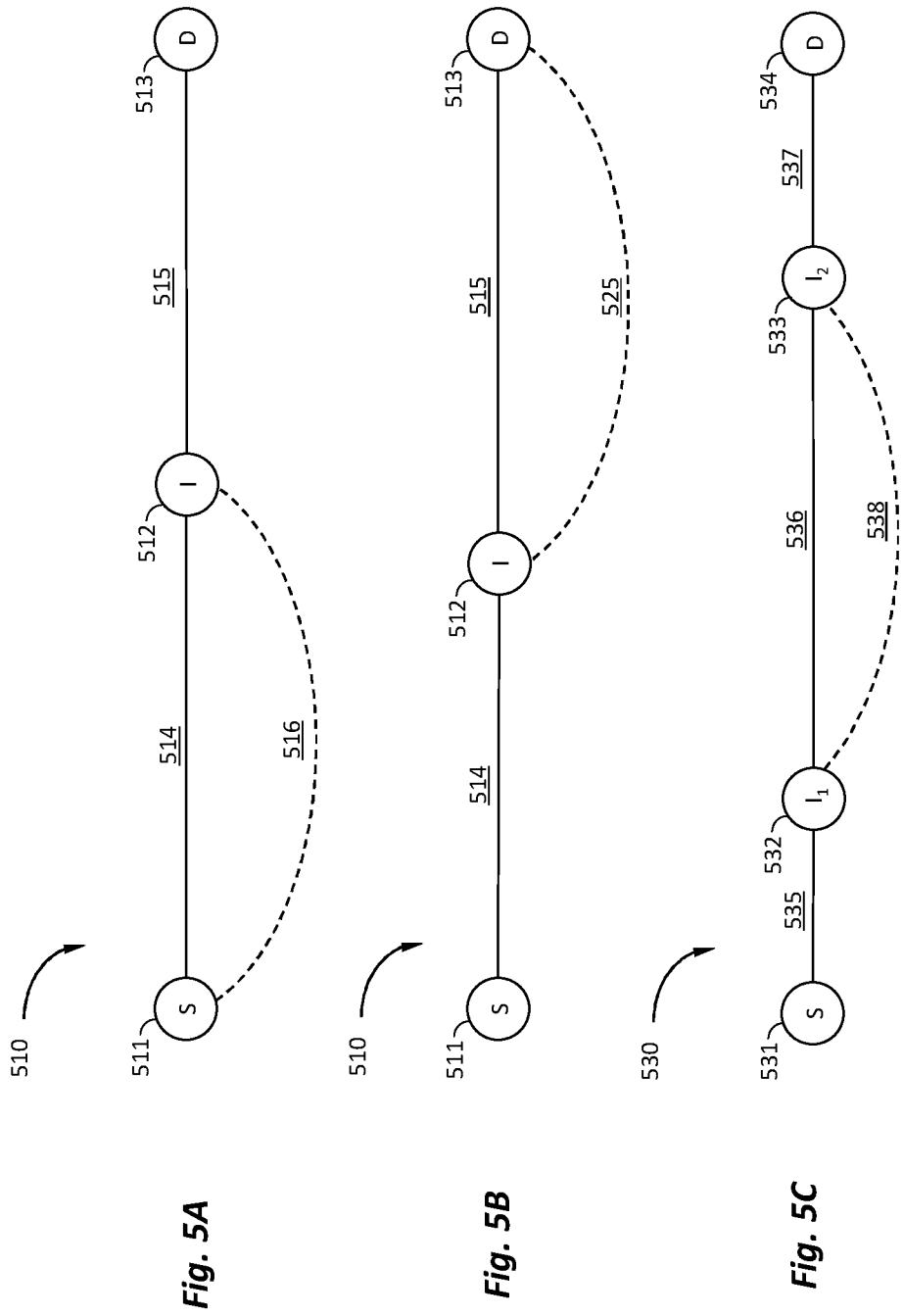
FIGS. 5A, 5B, and 5C are network diagram illustrating how path splitting can be employed by one or more nodes of a computer network, according to embodiments of the present disclosure.

FIGS. 5A-5C illustrate three path splitting scenarios involving intermediate node participation, according to some embodiments of the present disclosure. Like elements are shown using like references designations across FIGS. 5A-5C.

Referring to FIG. 5A, a simplified network 510 can include a source node 511, an intermediate node 512, and a destination node 513. Initially, a session between the source 511 and the destination 513 can include path 514 between the source 511 and the intermediate node 512 and path 515 between the intermediate node 512 and the destination 513. During the session, or at session setup, a second path 516 between the source 511 and the intermediate node 512 may become available to the source. In response, a multipath session based on paths 514 and 516 can be set up between the source 511 and the intermediate node 512. The session may be referred to as a "partial" multipath session because, while multiple paths exist between the source 511 and the intermediate node 512, there may only be a single path 515 available to the destination 513 (as illustrated in FIG. 5A). In this example, source node 511 may be referred to as the splitting node because it is node from which the secondary path forks out. Intermediate node 512 may be referred to as merging or terminating node because it is the node at which the secondary path 516 merges with the primary path 514.

As shown in FIG. 5B, a secondary path 525 can be setup between the intermediate node 512 and the destination 513. In this example, intermediate node 512 may be the splitting node and destination 513 may be the merging node.

Referring to FIG. 5C, a network 530 can include a source node 531, a first intermediate node 532, a second intermediate node 533, and a destination node 534. Initially, a session between the source 531 and the destination 534 can include path 535 between source 531 and first intermediate node 532, path 536 between first intermediate node 532 and second intermediate node 533, and path 537 between second intermediate node 533 and destination 534. During the session, or at session setup, a second path 538 between first and second intermediate nodes 536, 538 may become available. In response, first intermediate node 532 may perform path splitting to establish a partial multipath session between source 531 and destination 534, as shown in FIG. 5C. In this example, first intermediate node 532 may be the splitting node and second intermediate node 533 may be the merging node.

Partial multipath sessions can be managed using the same techniques described herein for "full" opportunistic multipath sessions. As for opportunistic multipath sessions, the process of setting up a partial, opportunistic, multipath session depends on the underlying network technology and may be carried out by network management or at the splitting/merging nodes. Also, path splitting may occur in response to a set of triggers that may include but is not limited to the discovery of a new route, new nodes, or fluctuations in path performance.

Owing to the participation of intermediate nodes, partial multipath sessions and accompanying path splitting and path merging operations, may be undertaken without knowledge of the source, the destination, or both. It can be carried out locally (e.g., in distributed systems) without need for network management intervention. Furthermore, path splitting and merging may involve only the endpoints of the new path.

In some embodiments, path splitting can be performed as a composable process that can occur opportunistically and recursively over a recently added path independently from the remaining participating nodes. For example, an intermediate node that is part of a recently added path may become the splitting node of a new path.

The path splitting process at a given node may vary based on whether networking coding is used on the primary path. If coding is used on the primary path, the splitting node may generate redundancy by recoding buffered frames (rather than creating a new coding stage) and distributing them among available paths. Path management can follow the principles described above and illustrated in FIGS. 2 and 4. If coding is not used on the primary path, the splitting node may start coding packets in order to distribute them among the multiple paths. In some embodiments, a merging node may perform decoding before frames are merged with uncoded frames. In both cases, the splitting node can adjust the DoFs over all participating paths as illustrated in FIGS. 2 and 4.

Figure 6:
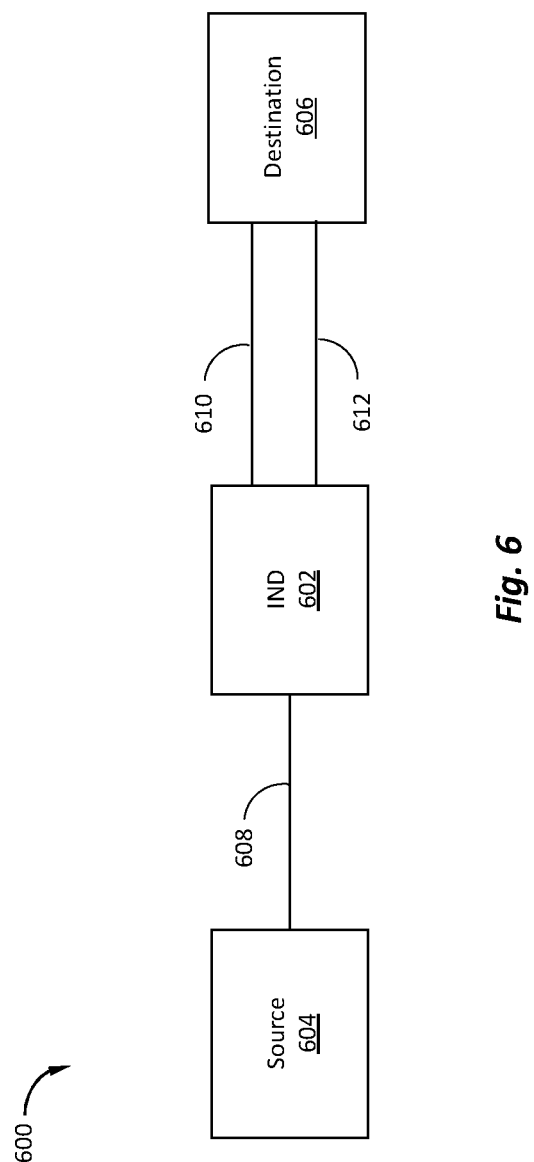
FIG. 6 is a network diagram illustrating translation between multiple different protocols, according to embodiments of the present disclosure.

Referring to FIG. 6, according to some embodiments of the present disclosure, a network 600 can include an intermediate network device (IND) 602 communicatively coupled between a source 604 and a destination 606. The IND 602 may be provided as a middlebox, proxy, or other type of device separate from the source 604 and the destination 606. In other embodiments, the IND functionality described herein may be implemented, in full or in part, within either the source 604 and/or the destination 606.

The IND 602 can carry out translation between multiple different protocols (e.g. coded/uncoded TCP, coded/uncoded QUIC, etc.). For a given connection, the device 602 can function as a virtual end-point, partially terminating a given uncoded connection (e.g., over TCP or QUIC) prior to encoding packets using network coding (NC) for transmission within a network that uses network coding. For example, source 604 may send uncoded data units (e.g., frames, packets, or DoFs) to IND 602 over a single path/connection 608 using conventional TCP. IND 602 may receive and buffer those data units, perform network coding on the buffered data units, and then distribute the coded data units over multiple paths 610, 612 to the destination 606. In one example, paths 610 and 612 may represent a WiFi network and an LTE network, respectively.

The operation of the IND 602 may be invisible to the source 604 and/or the destination 606. For example, a source 604 may communicate using TCP, whereas the destination 606 communicates using a coded multipath QUIC protocol. From the source's perspective, the destination uses TCP, and from the destination's perspective, the source uses a coded multipath QUIC protocol. The IND 602 translates between the two different protocols.

The translation of a connection denotes the decoding of data frames or packets received over one transport-layer connection using a given protocol (e.g. QUIC, NC/TCP) and the retransmission of the data in a frame or packet using a new protocol to a destination. Example translations include QUIC to NC/QUIC, QUIC to TCP, NC/TCP to NC/QUIC, Multipath NC QUIC to TCP, etc. The letters "NC" in these acronyms refers to network coding.

IND 602 may be provided as a networked device that sits within a network 600 (potentially between a closed LAN and a WLAN) that can partially initiate and terminate incoming connections or paths from multiple sources and toward multiple destinations. An IND 602 may be a receiver or destination of a connection as well.

IND 602 may partially terminate connections and act as a virtual end-point for both source and destination. In some embodiments, IND 602 can combine frames from multiple streams received across multiple incoming paths into one or more new (potentially multipath) outgoing connections. This includes topologies with (a) multiple connection/path input and single connection/path output, (b) multisource input to a single path/connection output, (c) a multisource input to a multipath output, where one or more incoming or outgoing connections/paths uses coding. In this disclosure, multisource operation denotes the transmission of one or more streams from more than one source simultaneously.

IND 602 can adjust protocol parameters and operation based on observed link statistics, sender/receiver requirements, user programmable inputs, etc. IND 602 can adjust protocol parameters and operation based on statistics and requirements observed from multiple connections across one or more sender-receiver pairs. Examples of protocol parameters that can be adjusted by the IND 602 include the size of a coding buffer (or "coding window"), flow/congestion control parameters, error correction parameters, encryption strength, path selection, the amount of redundancy generated by the coding process, encryption parameters, the set of paths used for transmitting data units, and the distribution of data units across those. Adjustable protocol operations can include managing acknowledgements (ACKs) between nodes, buffer size announcements, connection handshakes, and transmission of other control frames that may be required for successful protocol operation. IND 602 may also adjust/manage protocol parameters based on sender/receiver pair QoS requirements. For protocols that use network coding (NC), for example, this can include selecting coding window sizes and field sizes.

In further embodiment of the current disclosure, an IND may adjust protocol based on statistics and requirements observed from multiple connections across one or more sender-receiver pairs. Protocol operation includes managing ACKs, buffer size announcements, connection handshakes, and transmission of other control frames that may be required for successful protocol operation.

In an embodiment of the current disclosure, an IND may partially terminate (uncoded) transport protocol connections (e.g., QUIC, TCP) from multiple sources to the same destination, and encodes frames from their one or more data streams using NC for transmission over one or more NC/TCP or NC/QUIC connections. In this disclosure, partial termination of a connection at an IND denotes the provision by the IND of the transport and control-plane mechanisms of a destination node (e.g., feedback, data requests, etc.), effectively terminating the connection with the source, while at the same time forwarding stream data to the destination.

An IND may also partially terminate a coded transport protocol (NC/TCP, NC/QUIC), decode the packets, and retransmit them over an (uncoded) transport protocol connection (e.g., QUIC, TCP). Some embodiments may include translation between QUIC and a coded multipath QUIC protocol.

For both coded-to-uncoded and uncoded-to-coded translations described above, the IND may adjust the coding scheme (e.g., modify the code rate) of the coded paths according to destination QoS or congestion requirements.

If both coded-to-uncoded and uncoded-to-coded translations described above are based on QUIC (e.g., the input and output IND connections use QUIC, MP/QUIC and NC-MP/QUIC), the IND may also encode/decode data from multiple streams together, enabling streams sharing a segment of the route to share coding resources. Such a scheme may potentially combine the redundancy of streams from different sources using NC.

An IND may select which protocol to use for its output connections (e.g., regular vs. NC/QUIC) based on sender/receiver characteristics and requirements, and/or link QoS statistics. An IND may also partially terminate and translate connections from multiple sources over different transport protocols (e.g., one source using TCP, one source using QUIC) into a single connection with the destination over a transport protocol that uses NC and/or multipath (e.g., MPQUIC/NC). Multiple INDs may communicate with each other in order to manage multipath/multisource transmission. For example, referring to FIG. 5C, intermediate nodes 532, 533 can include represent INDs.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. In a system having a first node and a second node, a method comprising:
    transmitting first data units from the first node to the second node over a first path;
    receiving, by the first node, the second node, or both, information about one or more second paths between the first and second nodes, the received information comprising information on the path availability or path requirements;
    determining, by the first node, the second node, or both, a cost associated with the first path and each of the one or more second paths;
    transmitting second data units from the first node to the second node over the first path;
    determining, by the first node, the second node, or both, an allocation of the second data units to the one or more second paths based on the determined costs;
    generating, by the first node, network coded data units for transmission via the one or more second paths by:
        coding the second data units if network coding is not used in the first path; and
        recoding the second data units if network coding is used in the first path; and
    transmitting the network coded data units from the first node to the second node via the second paths.

2. The method of claim 1, wherein receiving information about the availability of the one or more second paths comprises receiving the information in a data request sent by the second node.

3. The method of claim 1, comprising:
    in response to receiving information about the availability of one or more second paths between the first and second nodes:
    generating redundant degrees of freedom (DoFs) by applying the network coding to the second data units; and
    transmitting the redundant DoFs from the first node to the second node over the first path and the one or more second paths according to the determined allocation.

4. The method of claim 1, wherein determining the cost associated with each of the one or more second paths comprises determining one or more cost factors associated with each of the one or more second paths.

5. The method of claim 4, wherein the one or more cost factors include at least one of:
    an absolute cost factor associated with a path;
    a relative cost factor for two different paths; or
    a total cost factor associated with two or more paths.

6. The method of claim 4, wherein the one or more cost factors include at least one of:
    a line delay;
    a usage cost;
    a load;
    a congestion; or
    a line variability.

7. The method of claim 4, wherein determining the one or more cost factors associated with each of the one or more second paths comprises:
    measuring packet delay; or
    receiving path state information from a network management unit.

8. The method of claim 1, wherein determining the cost associated with the first path and each of the one or more second paths comprises:
    using a cost control function based on at least one of:
    a fixed budget;
    a time-varying budget;
    a fixed budget and bandwidth usage predictions;
    a time-varying budget and bandwidth usage predictions; or
    bandwidth usage predictions.

9. The method of claim 1, wherein a number of second data units allocated to the one or more second paths is inversely proportional to the determined costs associated with the one or more second paths.

10. The method of claim 1, comprising:
    receiving updated information about one or more second paths between the first and second nodes;
    determining an updated cost associated with each of the one or more second paths;
        determining a second allocation of third data units to the one or more second paths based on the updated costs;
        transmitting the second allocation of third data units from the first nodes to the second nodes; and
        generating second network coded data units by:
            coding the third data units if network coding is not used in the first path; and
            recoding the third data units if network coding is used in the first path; and transmitting the second network coded data units from the first node to the second node over the one or more second paths.

11. The method of claim 10, comprising:
in response to determining an updated cost associated with each of the one or more second paths, terminating at least one of the second paths.

12. The method of claim 10, comprising:
in response to determining an updated cost associated with each of the one or more second paths, changing one or more of a coding scheme, a coding redundancy, or a number of degrees of freedom (DoFs) used in transmitting the third data units from the first node to the second node.

13. The method of claim 1, comprising:
transmitting a plurality of data units from the first node to one or more third nodes over a plurality of paths between the first node and the one or more third nodes, wherein the one or more third nodes are configured to transmit encoded data units to the second node over one or more paths between the one or more third nodes and the second node.

14. The method of claim 13, wherein the one or more third nodes include one or more access points (APs), wherein at least a first one of the plurality of paths between the first node and the one or more APs corresponds to a WiFi network, wherein at least a second one of the plurality of paths between the first node and the one or more APs corresponds to a cellular network.

15. The method of claim 13, wherein the one or more third nodes are configured to code data units received from two or more different first nodes together.

16. A method comprising:
obtaining, at a first node, a plurality of original packets to be transferred to a second node;
generating, by the first node, coded packets by linearly combining two or more of the plurality of original packets using network coding;
determining, by the first node, the second node, or both, a cost associated with transmitting data over each of a plurality of paths;
transmitting the coded packets from the first node to the second node via one or more first paths of the plurality of paths;
generating, by the first node, recoded packets by linearly combining two or more of the coded packets;
distributing, by the first node, the recoded packets among one or more second paths of the plurality of paths based on the cost; and
transmitting, by the first node, the recoded packets to the second node via the one or more second paths.

17. In a system having one or more first nodes, at least one second node, and a third node, wherein the second node and the third node are capable of establishing a transport session and transmitting encoded data between them via one or more available, different output paths between the second node and the third node, a method comprising:
transmitting data from the one or more first nodes to the third node via one or more first paths;
encoding, by the second node, the data if the data is not previously network coded to produce encoded data;
recoding, by the second node, the data if the data is previously network coded to produce recoded data; and
transmitting, by the second node the encoded data and/or the recoded data via one or more second paths of the output paths from the second node to the third node.

18. A device for use at a first node for transferring data to a second node, the device comprising:
a processor; and
a non-volatile memory storing computer program code that when executed on the processor causes the processor to execute a process operable to:
transmit first data units from the first node to the second node over a first path;
receive information about one or more second paths between the first and second nodes, the received information comprising information on the path availability or path requirements;
determine a cost associated with the first path and each of the one or more second paths;
transmit second data units from the first node to the second node over the first path; and
generate network coded data units by:
coding the second data units if network coding is not used in the first path; and
recoding the second data units if network coding is used in the first path; and
transmit the network coded data units from the first node to the second node via the second paths.

19. The device of claim 18, wherein receiving information about the availability of the one or more second paths comprises receiving the information in a data request sent by the second node.

20. The device of claim 18, comprising:
in response to receiving information about the availability of one or more second paths between the first and second nodes:
generating redundant degrees of freedom (DoFs) by applying network coding to the second data units; and
transmitting the redundant DoFs from the first node to the second node over the first path and the one or more second paths.

21. The device of claim 18, wherein determining a cost associated with each of the one or more second paths comprises determining one or more cost factors associated with each of the one or more second paths.

22. The device of claim 21, wherein the one or more cost factors include at least one of:
an absolute cost factor associated with a path;
a relative cost factor for two different paths; or
a total cost factor associated with two or more paths.

23. The device of claim 21, wherein the one or more cost factors include at least one of:
a line delay;
a usage cost;
a load;
a congestion; or
a line variability.

24. The method of claim 1 further comprising:
sending control frames between the first and the second node that contain information about the cost; and
adjusting one or more transmission characteristics of the path based on a given maximum target cost.

25. The method of claim 1 further comprising closing at least one of the second paths and/or opening an additional second path based on the determined costs.

* * * * *